(12) United States Patent
Kakinuma et al.

(10) Patent No.: US 7,407,187 B2
(45) Date of Patent: Aug. 5, 2008

(54) TWO-WHEELED VEHICLE AND CHASSIS BRAKING SYSTEM

(75) Inventors: Takekazu Kakinuma, Tokyo (JP);
Hiroaki Morikawa, Kanagawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/540,594

(22) Filed: Oct. 2, 2006

(65) Prior Publication Data

US 2007/0017754 A1      Jan. 25, 2007

Related U.S. Application Data

(62) Division of application No. 10/750,815, filed on Jan. 5, 2004, now abandoned.

(30) Foreign Application Priority Data

Jan. 17, 2003   (JP) .............................. 2003-009959

(51) Int. Cl.
*B60R 21/00* (2006.01)
(52) U.S. Cl. .................. 280/755; 280/43.14; 280/43.24; 280/652; 280/14.21; 280/28.11
(58) Field of Classification Search ................. 280/652, 280/47.34, 63, 755, 757, 9, 14.21, 28.11, 280/43.14, 43.24, 87.041
See application file for complete search history.

(56) References Cited

U.S. PATENT DOCUMENTS

| | | | | |
|---|---|---|---|---|
| 2,886,139 A | * | 5/1959 | Wilson | 188/5 |
| 3,566,994 A | * | 3/1971 | Isaacs | 188/5 |
| 3,701,396 A | | 10/1972 | House | |
| 3,889,964 A | * | 6/1975 | Pitts, Jr. | 280/43.24 |
| 4,200,162 A | * | 4/1980 | Tax | 180/23 |
| 4,747,180 A | * | 5/1988 | Screen | 16/35 R |
| 5,035,445 A | * | 7/1991 | Poulin | 280/763.1 |
| 5,398,952 A | * | 3/1995 | Wagner et al. | 280/43.24 |
| 5,401,055 A | | 3/1995 | Pham | |
| 5,431,254 A | * | 7/1995 | Kramer et al. | 188/7 |
| 6,062,600 A | | 5/2000 | Kamen et al. | |
| 6,076,838 A | * | 6/2000 | Peterson et al. | 280/32.6 |
| 6,106,054 A | | 8/2000 | Wagner | |
| 6,170,847 B1 | | 1/2001 | Pham | |
| 6,217,044 B1 | * | 4/2001 | Beeche et al. | 280/43 |
| 6,454,285 B1 | * | 9/2002 | Koenig | 280/250.1 |
| 6,460,641 B1 | | 10/2002 | Kral | |
| 6,585,065 B1 | * | 7/2003 | Frejaville | 180/65.1 |

(Continued)

FOREIGN PATENT DOCUMENTS

JP        51-115338         9/1976

(Continued)

*Primary Examiner*—Toan C To
(74) *Attorney, Agent, or Firm*—Oblon, Spivak, McClelland, Maier & Neustadt, P.C.

(57) ABSTRACT

A chassis braking system for braking a chassis includes a braking unit including a braking surface biased toward a road surface on which the chassis runs and having a first state where movement of the braking surface toward the road surface is locked and a second state where the braking surface abuts against the road surface. A control unit releases the lock of the braking unit and shifts the braking unit from the first state to the second state when predetermined conditions are met.

11 Claims, 12 Drawing Sheets

U.S. PATENT DOCUMENTS

| | | |
|---|---|---|
| 6,637,763 B2 | 10/2003 | Kuo |
| 6,942,053 B2 | 9/2005 | Hinton |
| 7,036,636 B2 * | 5/2006 | Sullivan et al. ............ 188/5 |
| 7,040,460 B1 * | 5/2006 | Sherrill et al. ............. 188/5 |
| 2002/0135142 A1 | 9/2002 | Hinds |
| 2003/0090097 A1 | 5/2003 | Ranc |
| 2005/0035583 A1 | 2/2005 | Hinton |
| 2005/0077715 A1 | 4/2005 | Mulhern et al. |
| 2005/0206149 A1 | 9/2005 | Mulhern et al. |
| 2005/0248140 A1 | 11/2005 | Wagner |

FOREIGN PATENT DOCUMENTS

| | | |
|---|---|---|
| JP | 58-49562 | 3/1983 |
| JP | 61-183757 | 11/1986 |
| JP | 4-41479 | 4/1992 |
| JP | 5-42024 | 6/1993 |
| JP | 6-6143 | 1/1994 |
| JP | 6-92273 | 4/1994 |
| JP | 2000-514680 | 11/2000 |
| JP | 2000-335384 | 12/2000 |
| JP | 2004-129435 | 4/2004 |
| WO | WO 01/46003 | 6/2001 |

* cited by examiner

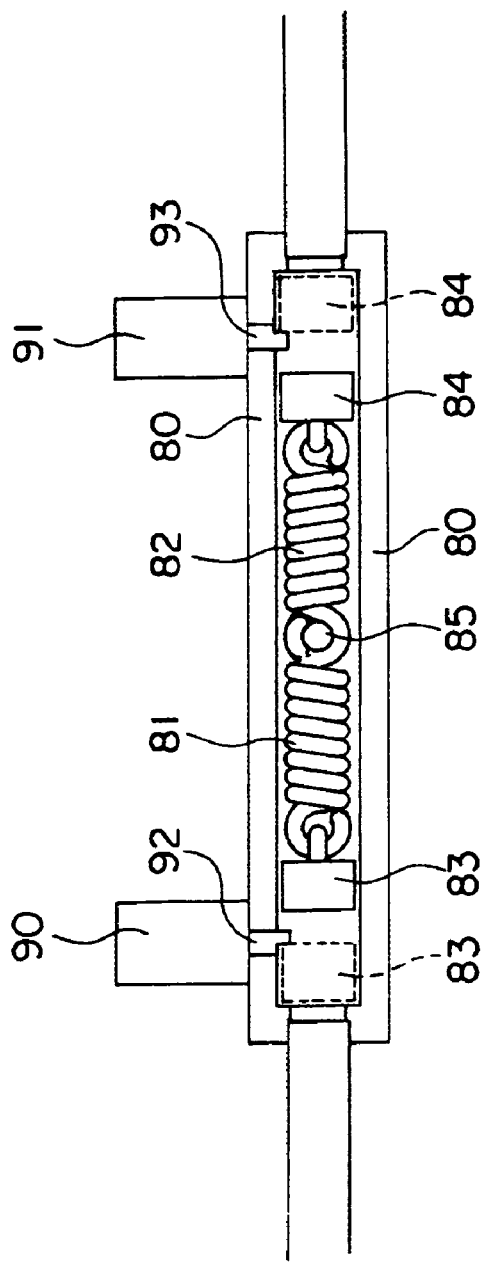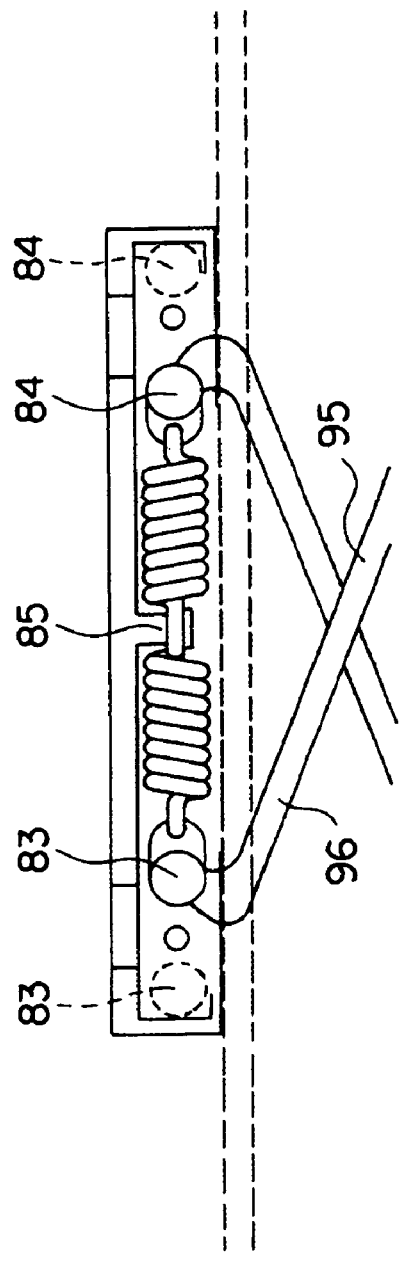
FIG. 12A
FIG. 12B

TWO-WHEELED VEHICLE AND CHASSIS BRAKING SYSTEM

CROSS-REFERENCE TO RELATED APPLICATIONS

This application is a Divisional of U.S. patent application Ser. No. 10/750,815, filed Jan. 5, 2004, and claims priority to Japanese Patent Application No. 2003-009959, filed Jan. 17, 2003.

BACKGROUND OF THE INVENTION

1. Field of the Invention

The present invention relates to a two-wheeled vehicle provided with an auxiliary wheel and a chassis braking system for braking movement of a chassis.

2. Description of the Related Art

A two-wheeled vehicle which runs with a person riding on it is known. Such a two-wheeled vehicle autonomously stabilizes and stands when the wheels are normally controlled in drive. For example, Japanese Unexamined Patent Publication (Kokai) No. 01-316810 discloses a two-wheeled vehicle provided with an auxiliary wheel for assisting the wheels when autonomous stability is lost. This auxiliary wheel constantly assists the wheels not only at the time of abnormalities in operation such as when autonomous stability is lost, but also at the time of normal operation when autonomous stability is maintained.

However, in such a two-wheeled vehicle of the related art, when the auxiliary wheel assists the wheels at the time of normal operation, there is the problem that the mobility of the two-wheeled vehicle is lost.

SUMMARY OF THE INVENTION

An object of the present invention is to provide a two-wheeled vehicle able to assist the wheels and keep the chassis in a stable posture at the time of abnormal operation without detracting from the mobility at the time of normal operation. Another object of the present invention is to provide a chassis braking system able to effectively brake a running chassis and a two-wheeled vehicle using that chassis braking system.

To attain the above object, according to a first aspect of the present invention, there is provide a two-wheeled vehicle comprising a first wheel and a second wheel rotating about shafts perpendicular to a running direction and arranged at a chassis along the perpendicular direction, a third wheel comprising a first state assisting the first wheel and the second wheel and a second state up to shifting to the first state, and a control means for shifting the third wheel from the second state to the first state when detecting an abnormality in running of the chassis.

The mode of operation of the two-wheeled vehicle of the first aspect of the invention is as follows: The first wheel and second wheel rotate about shafts arranged perpendicular to the running direction to thereby allow movement of the chassis. The control means shifts the two-wheeled vehicle from the second state to the first state when detecting an abnormality in running of the chassis. Due to this, the third wheel assists the first wheel and second wheel in the first state.

According to a second aspect of the present invention, there is provided chassis braking system for braking a chassis, comprising a braking means comprising a braking surface biased toward a road surface on which the chassis runs and comprising a first state where movement of the braking surface toward said road surface is locked and a second state where the braking surface abuts against the road surface and a control means for releasing the lock of said braking means and shifting the braking means from the first state to the second state when predetermined conditions are met.

The mode of operation of the chassis braking system of the second aspect of the invention is as follows. The control means releases the lock of the braking means and shifts the braking means from the first state to the second state when predetermined conditions are met. Due to this, in the braking means, the lock on movement of the braking surface toward the road surface is released and the braking surface abuts against the road surface.

According to a third aspect of the present invention, there is provided a two-wheeled vehicle comprising a first wheel and a second wheel rotating about shafts perpendicular to a running direction and arranged at a chassis along the perpendicular direction, a braking means comprising a braking surface biased toward a road surface on which the first wheel and said second wheel run and comprising a first state where movement of the braking surface toward the road surface is locked and a second state where the braking surface abuts against the road surface, and a control means for releasing the lock of said braking means and shifting the braking means from the first state to the second state when predetermined conditions are met.

BRIEF DESCRIPTION OF THE DRAWINGS

These and other objects and features of the present invention will become clearer from the following description of the preferred embodiments given with reference to the attached drawings, wherein:

FIGS. 11A to 11C are views explaining the configuration of the brake 21, wherein FIG. 11A is a front view (seen from above step board), FIG. 11B is a side view seen from the side of the arrow A shown in FIG. 11A, FIG. 12A is an enlarged view of the vicinity of a braking base shown in FIG. 11A and FIG. 12B is an enlarged view of the vicinity of a braking base shown in FIG. 11B.

DETAILED DESCRIPTION OF THE INVENTION

Preferred embodiments of the present invention will be described in detail below while referring to the attached figures.

First Embodiment

The first embodiment corresponds to the first aspect of the invention.

Figure 1:
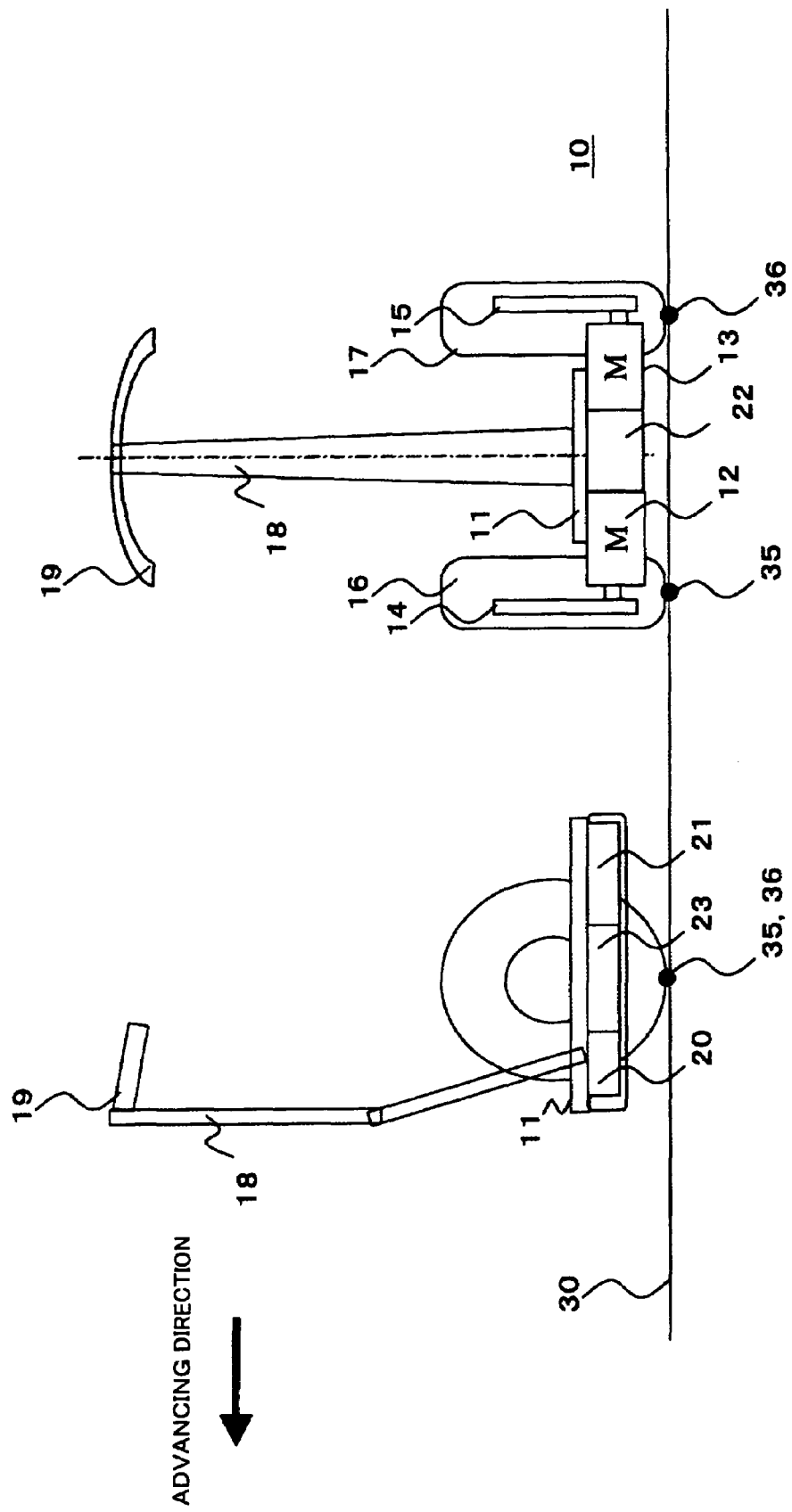
FIGS. 1A and 1B are views of the configuration a two-wheeled vehicle according to a first embodiment of the present invention.
FIG. 1C is a side view seen from the side of the arrow B shown in FIG. 11A.

FIGS. 1A and 1B are views of the configuration of a two-wheeled vehicle 10 according to the present embodiment. FIG. 1A is a view of the configuration seen from the side, while FIG. 1B is a view of configuration seen from the front. As shown in FIGS. 1A and 1B, the two-wheeled vehicle 10 has for example a step board 11, a first motor 12, a second motor 13, a first transmission and deceleration mechanism 14, a second transmission and deceleration mechanism 15, a first wheel 16, a second wheel 17, a stay 18, a handle 19, a sensor group 20, a battery 21, an auxiliary wheel drive 22, and a wheel drive 23. Here, the wheel drive 23 corresponds to the drive controller of the present invention, the first wheel 16 corresponds to the first wheel of the present invention, and the second wheel 17 corresponds to the second wheel of the present invention.

The two-wheeled vehicle 10 is characterized by having a first auxiliary wheel 41 and a second auxiliary wheel 60 (shown in FIG. 3) which are stored away at the time of normal operation (second state of present invention) and which spring out toward the road surface 30 to shift to a state assisting the first wheel 16 and second wheel 17 (first state of present invention) at the time of abnormal operation.

As shown in FIGS. 1A and 1B, the first wheel 16 and second wheel 17 contact the road surface 30 at contact points 35 and 36. When the operator shifts his or her center of gravity, the step board 11 tilts in the + and − directions about an axle accordingly. In the present embodiment, tilt in the + direction of the step board 11 means the rise of the front of the step board 11, that is, the side in the direction of advance in FIG. 1A, while tilt in the − direction means the rise of the back of the step board 11, that is, the side opposite to the direction of advance in FIG. 1A.

The step board 11 is where the user places his or her two feet when riding the vehicle. The first motor 12 and the second motor 13 are motors using for example winding coils. The first motor 12 generates rotational force based on a first drive signal from the wheel drive 23 and transmits this through the first transmission and deceleration mechanism 14 to the axle of the first wheel 16. The second motor 13 generates rotational force based on a second drive signal from the wheel drive 23 and transmits this through the second transmission and deceleration mechanism 15 to the axle of the second wheel 17.

The step board 11 is provided with the handle 19 through the stay 18. The handle 19 is gripped by the two hands of the user when the vehicle is ridden. The step board 11 is provided with a sensor group 20 including a tilt sensor for detecting tilt of the step board 11 with respect to the horizontal direction.

Sensor Group 20

Figure 2:
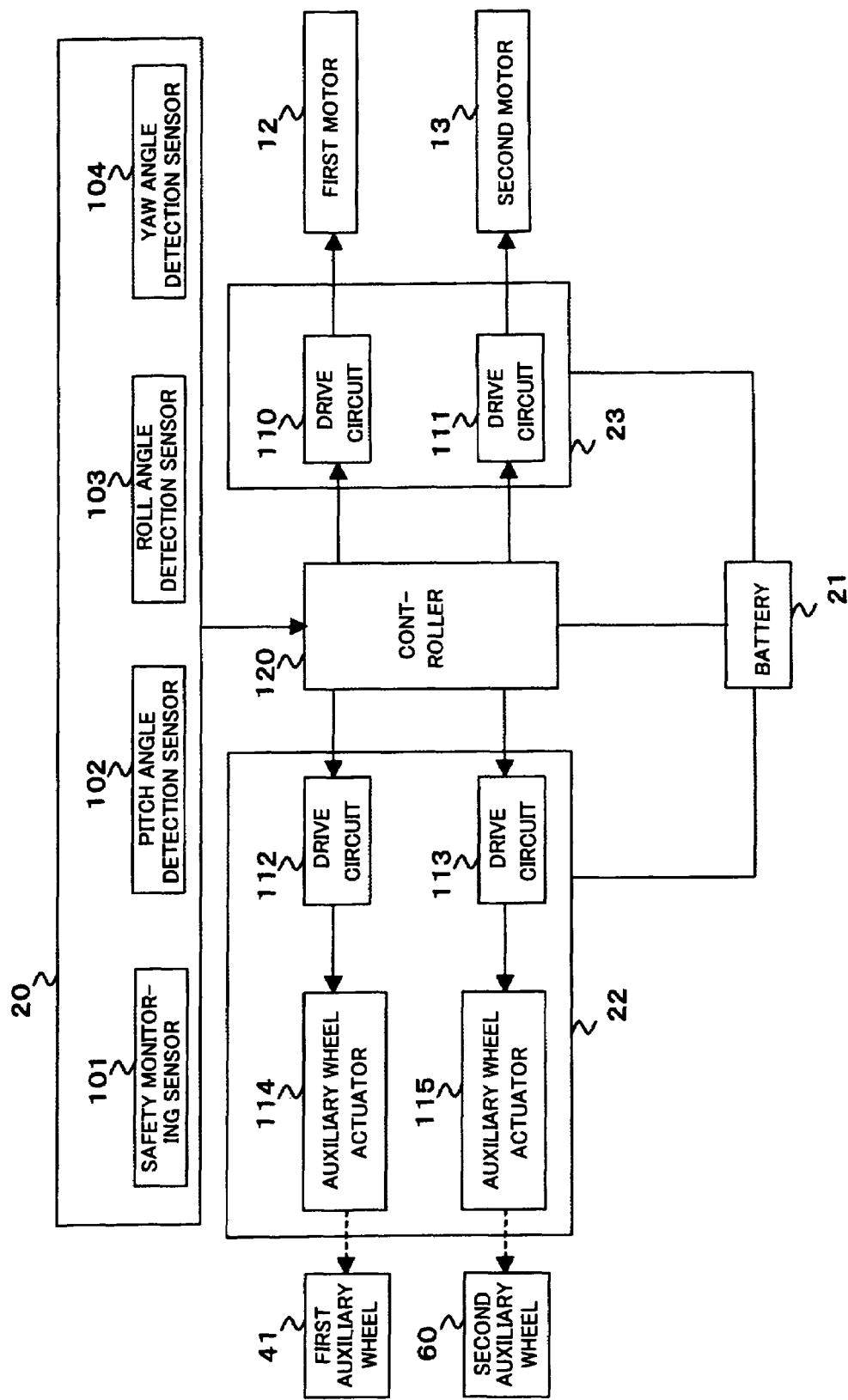
FIG. 2 is a view for explaining a sensor group, auxiliary wheel drive, wheel drive, and controller shown in FIGS. 1A and 1B.

FIG. 2 is a view for explaining the sensor group 20, auxiliary wheel drive 22, and wheel drive 23 shown in FIGS. 1A and 1B and the controller 120 etc. The auxiliary wheel drive 22 and the controller 120 correspond to the control means of the present invention, while the wheel drive 23 corresponds to the drive means of the present invention. As shown in FIG. 2, the sensor group 20 for example has a safety monitoring sensor 101, a pitch angle detection sensor 102, a roll angle detection sensor 103, and a yaw angle detection sensor 104.

The pitch angle detection sensor 102, the roll angle detection sensor 103, and the yaw angle detection sensor 104 for example are provided with a gyro or a rigid spindle with a center of gravity offset from a shaft of a rotary variable resistor changing in resistance according to the rotational angle. The safety monitoring sensor 101 for example is used for constantly monitoring for problems in springout mechanisms of the auxiliary wheels and ensuring the running reliability of the two-wheeled vehicle 10. The controller 120 controls the springout operations of the auxiliary wheels and outputs an alarm by display on a display unit, sound, etc. based on a detection signal from the safety monitoring sensor 101. Note that the safety monitoring sensor 101, the pitch angle detection sensor 102, the roll angle detection sensor 103, and the yaw angle detection sensor 104 are not limited in mounting positions.

Battery 21

The battery 21, as shown in FIG. 2, supplies power to the components of the two-wheeled vehicle 10 including the auxiliary wheel drive 22, the drive 23, and the controller 120.

Auxiliary Wheel Drive 22

The auxiliary wheel drive 22 for example has a drive circuit 112, a drive circuit 113, an auxiliary wheel actuator 114, and an auxiliary wheel actuator 115. The drive circuit 112 generates a drive signal based on a control signal from the controller 120 and outputs this to the auxiliary wheel actuator 114. The drive circuit 113 generates a drive signal based on a control signal from the controller 120 and outputs this to the auxiliary wheel actuator 115. The auxiliary wheel actuator 114, as explained later, drives movement of the first auxiliary wheel 41 from the recessed state (recessed position) to the auxiliary state (auxiliary position). The auxiliary wheel actuator 115, as explained later, drives movement of the second auxiliary wheel 60 from the recessed state to the auxiliary state.

Wheel Drive 23

The wheel drive 23 has for example a drive circuit 110 and a drive circuit 111. The drive circuit 110 generates a drive signal based on a control signal from the controller 120 and outputs this to the first motor 12. The drive circuit 111 generates a drive signal based on a control signal from the controller 120 and outputs this to the second motor 13.

Controller 120

The controller for example generates control signals for output to the drive circuits 110 and 111 to control the rotation of the first wheel 16 and the second wheel 17 based on a rotation signal in accordance with an operation of the operator of the handle 19 etc. so that the two-wheeled vehicle 10 runs in accordance with that operation.

Further, the controller 120 receives as input detection signals from the sensors of the sensor group 20 and generates drive signals for output to the drive circuits 110, 111, 112, and 113 based on these detection signals. Specifically, the controller 120 detects an abnormality in the two-wheeled vehicle 10 based on the detection signals from the sensors of the sensor group and, based on the result, generates drive signals for output to the drive circuits 110, 111, 112, and 113. The controller 120 for example detects an abnormality as having occurred in the following cases:
(1) When the operator depresses a not shown emergency stop switch.
(2) When a voltage of the battery 21 falls below a prescribed value.
(3) When an abnormality in communication arises between the drive circuits 110, 111, 112, and 113, the sensor group 20, the first motor 12, the second motor 13, the auxiliary wheel actuator 114, and the auxiliary wheel actuator 115 and the controller 120.
(4) When a load exceeding the rated torque of the first motor 12 and the second motor 13 is applied for more than a prescribed time (for example, more than 5 seconds).
(5) When a detected temperature of a thermistor sensor provided in a radiator of the drive circuit 110, 111, 112, or 113 exceeds a prescribed value.
(6) When a drive signal from the drive circuit 110 or the drive circuit 111 and a rotational angle detection output of the first motor 12 or the second motor 13 are separated by more than a predetermined reference value.
(7) When the controller 120 does not output a processing result within a predetermined time or when the controller 120 cannot refer to predetermined stored data or another error arises.
(8) When the two-wheeled vehicle 10 is in a stopped or running state and the pitch angle of the step board 11 shown by the detection signal of the pitch angle detection sensor 102 exceeds an angle considered normal (for example, ±3°). This case is deemed to present the danger of tip over of the step board 11.
(9) When the two-wheeled vehicle 10 is in a stopped or running state and the yaw angle of the step board 11 shown by the detection signal of the yaw angle detection sensor 104 exceeds an angle considered normal (for example, ±10°). This case is deemed to present the danger of tip over of the step board 11.
(10) When the two-wheeled vehicle 10 is in a stopped or running state and the roll angle speed of the step board 11 shown by the detection signal of the roll angle detection sensor 103 exceeds a speed considered normal (for example, a centrifugal force of 0.3G). This case is deemed to result in the operator being swung off.
(11) When the safety system is deemed to have broken down or be malfunctioning by the safety monitoring sensor 101.

Figure 3:
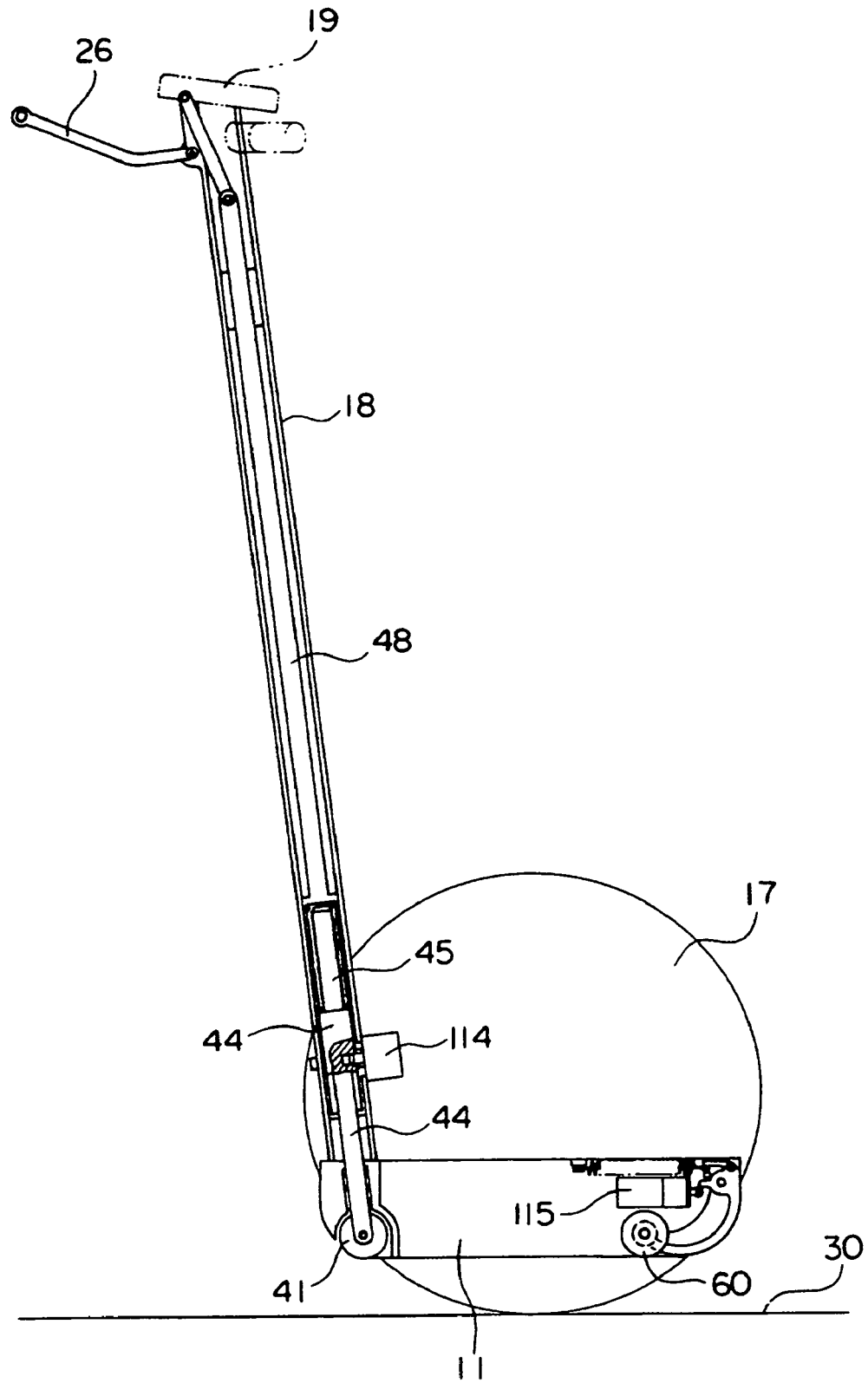
FIG. 3 is a view of the configuration of a side of a two-wheeled vehicle showing the configuration relating to the auxiliary wheel drive of the two-wheeled vehicle shown in FIGS. 1A and 1B.

FIG. 3 is a view of the configuration of the two-wheeled vehicle 10 seen from the side showing the configuration relating to the auxiliary wheel drive of the two-wheeled vehicle 10 shown in FIGS. 1A and 1B. As shown in FIG. 3, the two-wheeled vehicle 10 is provided with a first auxiliary wheel 41 and second auxiliary wheel 60.

First Auxiliary Wheel 41

Figure 4:
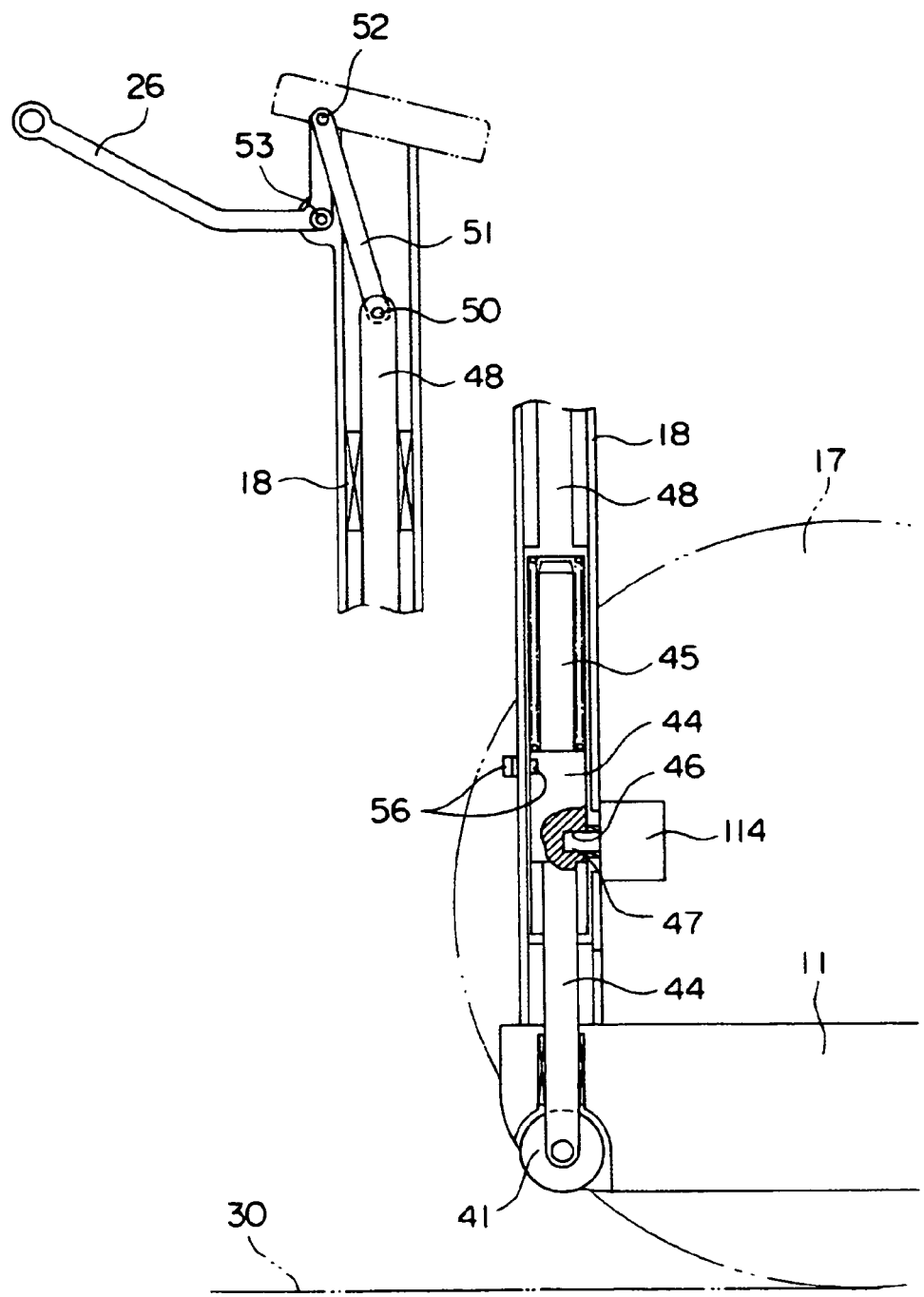
FIG. 4 is a view explaining the configuration of the surroundings of a first auxiliary wheel and surroundings of a manual lever shown in FIG. 3 in the state where the first auxiliary wheel is stored away.

First, the configuration of the surroundings of the first auxiliary wheel 41 and the surroundings of the manual lever 26 shown in FIG. 3 will be explained. FIG. 4 is a view for explaining the configuration of the surroundings of the first auxiliary wheel 41 and the surroundings of the manual lever 26 shown in FIG. 3.

As shown in FIG. 3 and FIG. 4, the step board 11 holds inside it the first auxiliary wheel 41 and second auxiliary wheel 42 at the time of normal operation. That is, the first auxiliary wheel 41 and second auxiliary wheel 42 do not contact the road surface 30. The shaft of the first auxiliary wheel 41 is fixed to one end of a shank 44 provided in the cylindrical stay 18. The first auxiliary wheel 41 rotates about the shaft. The other end of the shank 44 is fixed to one end of a coil spring 45. The shank 44 is biased in a direction moving the first auxiliary wheel 41 toward the road surface 30 by the coil spring 45. Further, the stay 18 supports inside it the other end of the coil spring 45 at one end of a coupling 48.

Figure 5:
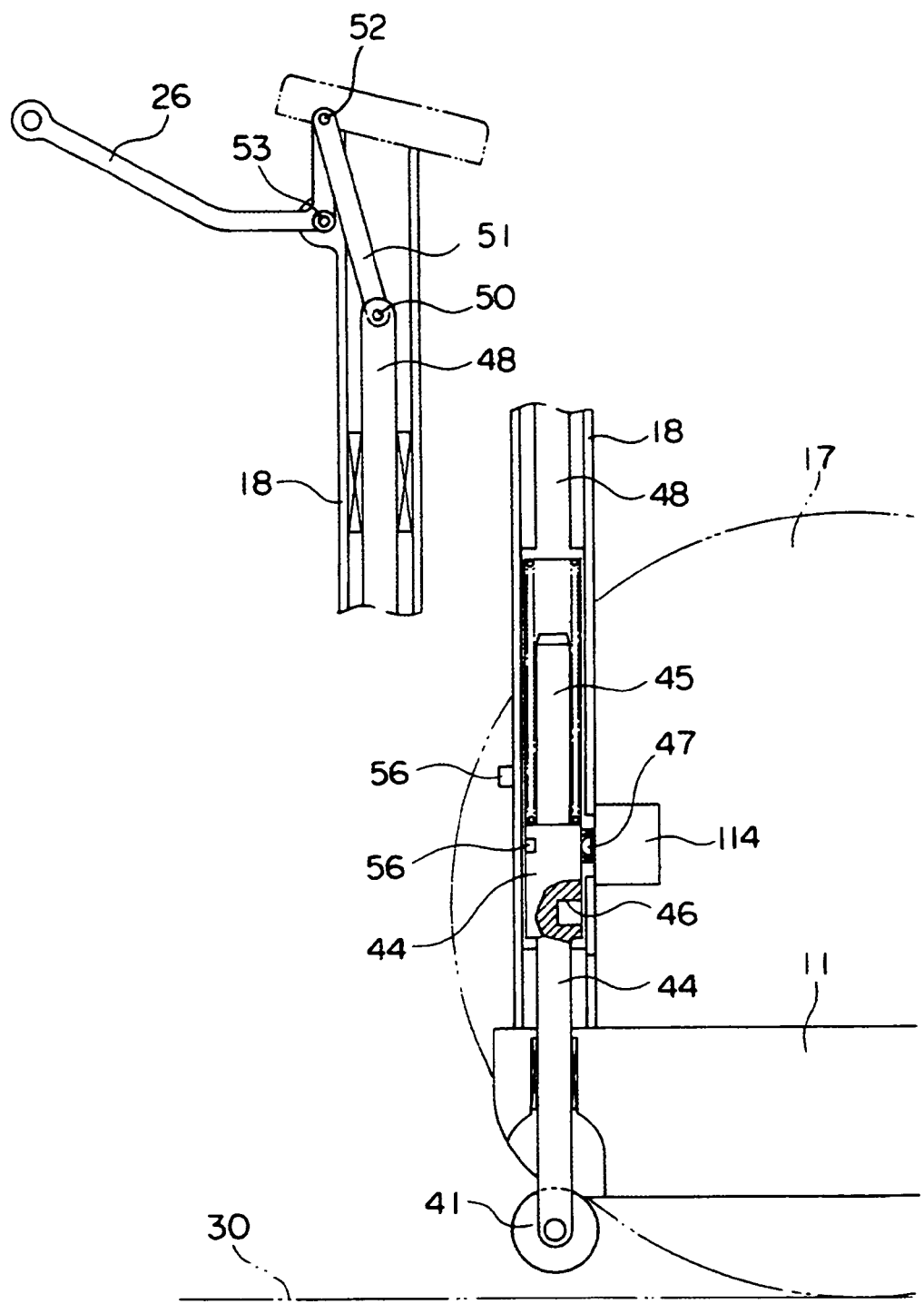
FIG. 5 is a view explaining the configuration of the surroundings of a first auxiliary wheel and surroundings of a manual lever shown in FIG. 3 in the state where the first auxiliary wheel springs out toward the road surface.

Further, the shank 44 is provided with a recess 46 at the auxiliary wheel actuator 114 side. The recess 46 has a projection 47 fit inside it at the time of normal operation. Due to this, the shank 44 is locked from movement due to the biasing force (elasticity) of the coil spring 45. The projection 47 is moved to a position detached from the recess 46 (moved in the right direction in FIG. 4) by the auxiliary wheel actuator 114 as shown in FIG. 5 to release the lock. Due to this, the shank 44 moves due to the biasing force of the coil spring 45 (moves in the downward direction in FIG. 4) and the first auxiliary wheel 41 contacts the road surface 30. That is, the first auxiliary wheel 41 springs out.

As shown in FIG. 4, the other end of the coupling 48 is coupled with the manual lever 26 through the shaft 50, coupling (link shaft) 51, and shaft 52. If the operator pulls the manual lever 26 in the direction of the arrow in FIG. 6, the shaft 50 and shaft 52 rotate, the coupling 51 moves, and the front end of the coupling 51 pushes the coupling 48 in a direction whereby the first auxiliary wheel 41 heads toward the road surface 30 (downward in FIG. 6). Due to this, in the state where the projection 47 is fit in the recess of the shank 44 (locked state), the coupling 48, coil spring 45, shank 44, auxiliary wheel actuator 114, and first auxiliary wheel 41 form a single entity and move downward in FIG. 6, whereby the first auxiliary wheel 41 contacts the road surface 30. That is, the first auxiliary wheel 41 springs out. The spring out operation of the first auxiliary wheel 41 due to the operation of the stay 18 is performed not only when the operator detects some sort of abnormal condition, but also when making the first auxiliary wheel 41 function as a stand at the time of stopping the two-wheeled vehicle 10.

Further, the sensor 56 for example functions as the safety monitoring sensor 101 shown in FIG. 2 and detects movement of the shank 44 by detecting a change in the magnetic force caused by movement of the shank 44. Specifically, the sensor 56 detects movement of the shank 44 to detect whether the first auxiliary wheel 41 has sprung out toward the road surface 30. The sensor 56 outputs a detection signal to the controller 120.

Second Auxiliary Wheel 60

Figure 7:
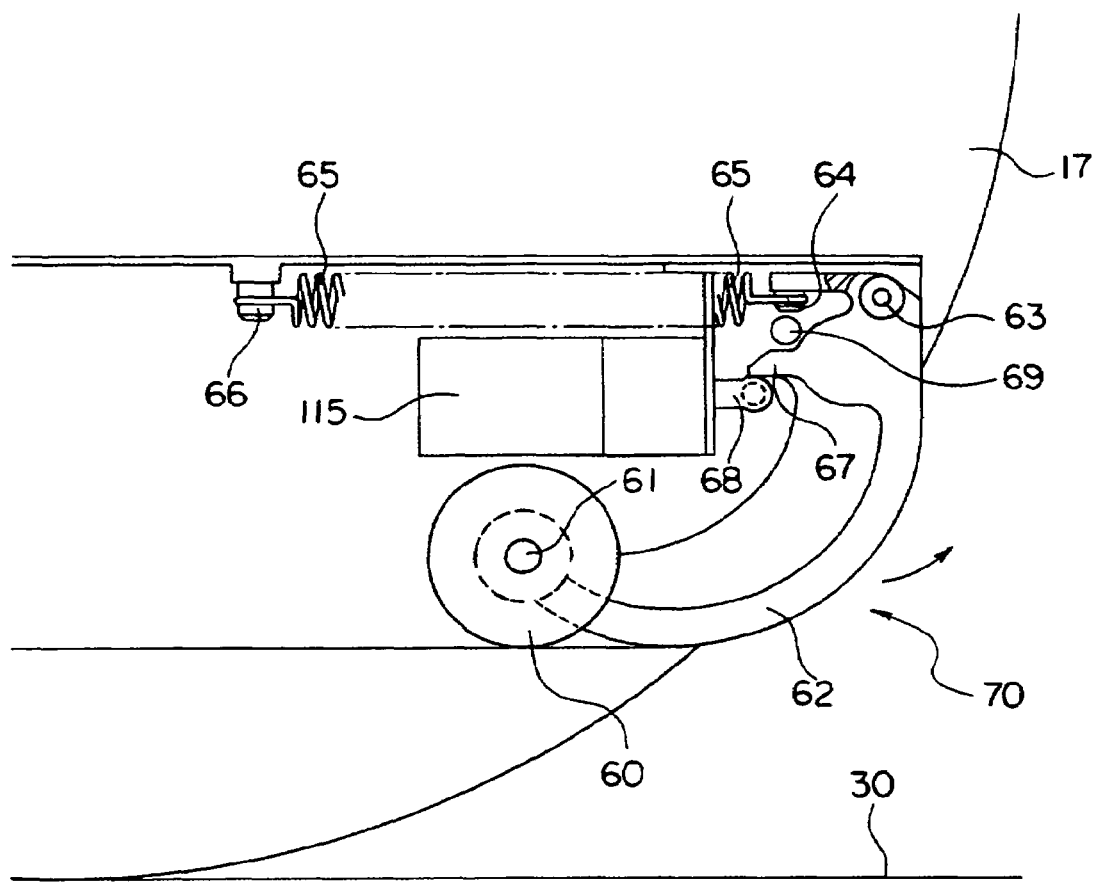
FIG. 7 is a view explaining the configuration of the surroundings of a second auxiliary wheel shown in FIG. 3 in the state where the second auxiliary wheel is stored away.

Next, the configuration of the surroundings of the second auxiliary wheel 60 shown in FIG. 3 will be explained. FIG. 7 is a view for explaining the configuration of the surroundings of the second auxiliary wheel 60 shown in FIG. 3. As shown in FIG. 7, the second auxiliary wheel rotates about a shaft 61. The shaft 61 is fixed to one end of an arm 62. The other end of the arm 62 rotates about a shaft 63 fixed to the step board 11. A coupling 64 of the arm 62 is fixed to one end of a coil spring 65. Note that the coupling 64 may also be attached to a link arm fixed to the arm 62. The other end of the coil spring 65 is fixed to a fixing part 66 fixed to the step board 11. The arm 62 is in the rotational position shown in FIG. 7 at the time of normal operation (second state of present invention). A projection 67 forming part of the arm 62 engages with a projection 68, whereby the arm 62 is locked from rotation by the biasing force of the coil spring 65. Due to this, the second auxiliary wheel 60 does not contact the road surface 30, that is, is in the recessed state.

Figure 8:
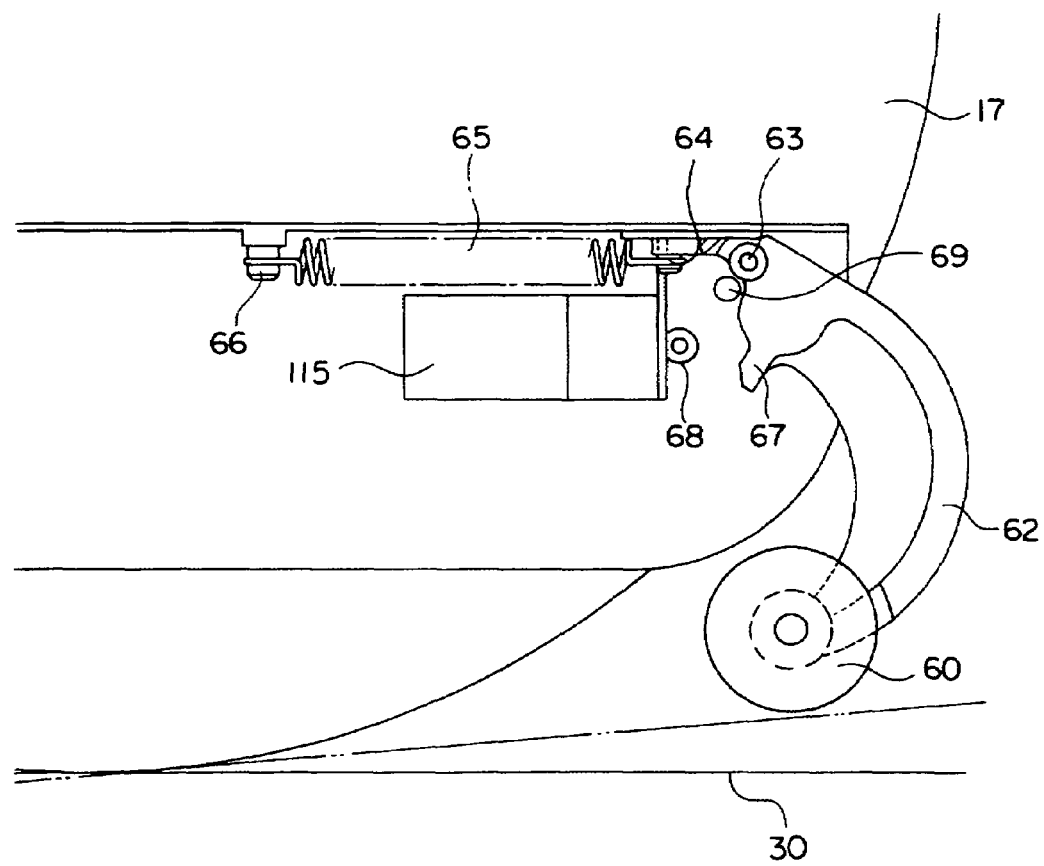
FIG. 8 is a view explaining the configuration of the surroundings of a second auxiliary wheel shown in FIG. 3 in the state where the second auxiliary wheel springs out toward the road surface.

The auxiliary wheel actuator 115 moves the projection 68 in a direction disengaging it from the projection 67, that is, the left direction in FIG. 7, at the time of an abnormal operation. Due to this, the projection 67 and projection 68 are disengaged, whereby the biasing force of the coil spring 65 causes the arm 62 to turn in the direction of the arrow in FIG. 7 and, as shown in FIG. 8, the second auxiliary wheel 60 to spring out toward the road surface 30. At this time, the arm 62 strikes a stopper pin 69 fixed to the step board 11 and so is fixed at a predetermined angle. This predetermined angle is defined so that a rotational moment occurring at the arm 62 is received by the stopper pin 69 when the shaft 63 and shaft 61 of the arm 62 are off from the vertical of the road surface 30 and a load is applied to the second auxiliary wheel 60 from above. Note that the above-mentioned first auxiliary wheel 41 and second auxiliary wheel 60 are returned manually to the positions of the above-mentioned normal state after springing out toward the road surface 30 as explained above.

Figure 6:
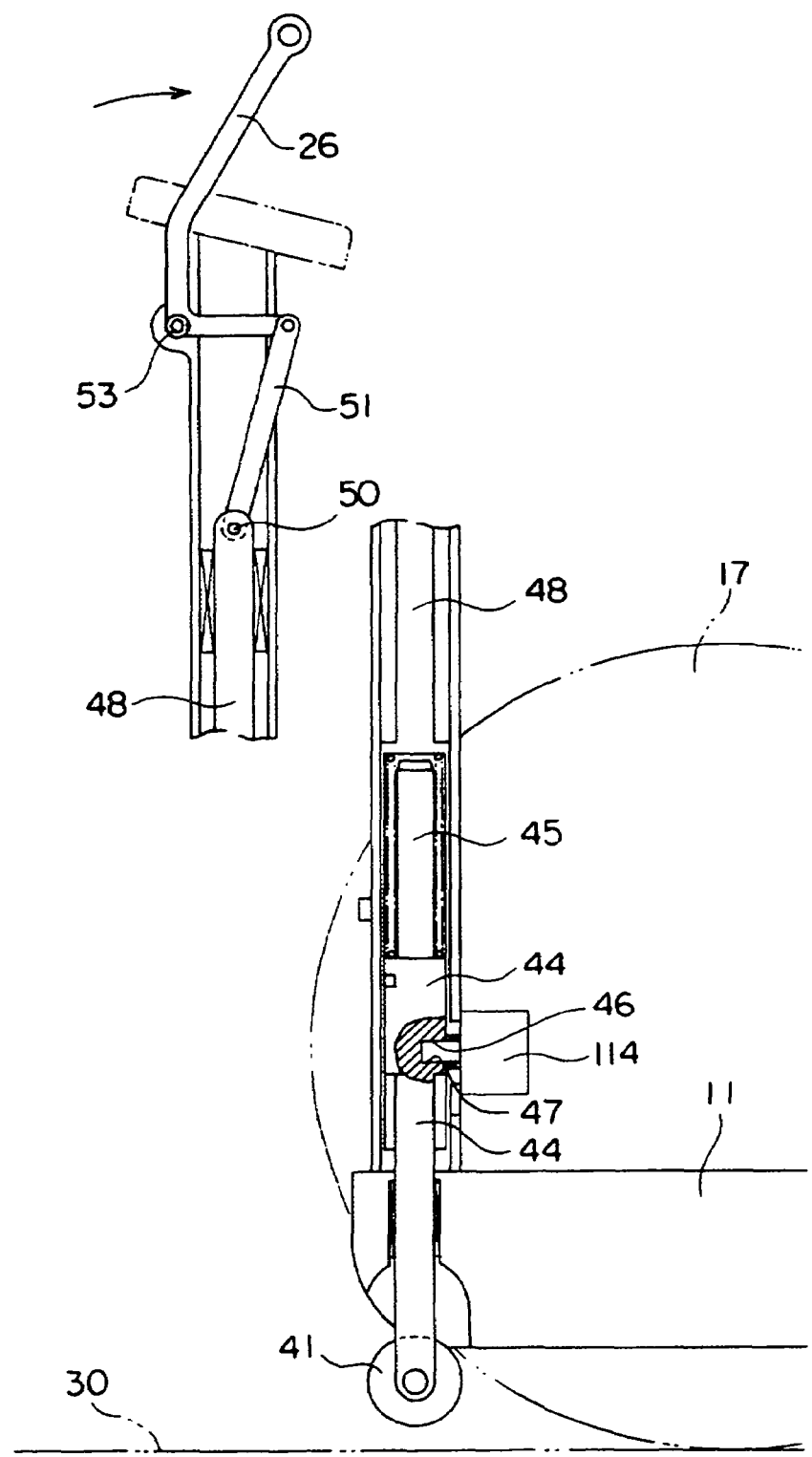
FIG. 6 is a view explaining the configuration of the surroundings of a first auxiliary wheel and surroundings of a manual lever shown in FIG. 3 in the case where the manual lever is pulled.
Figure 9:
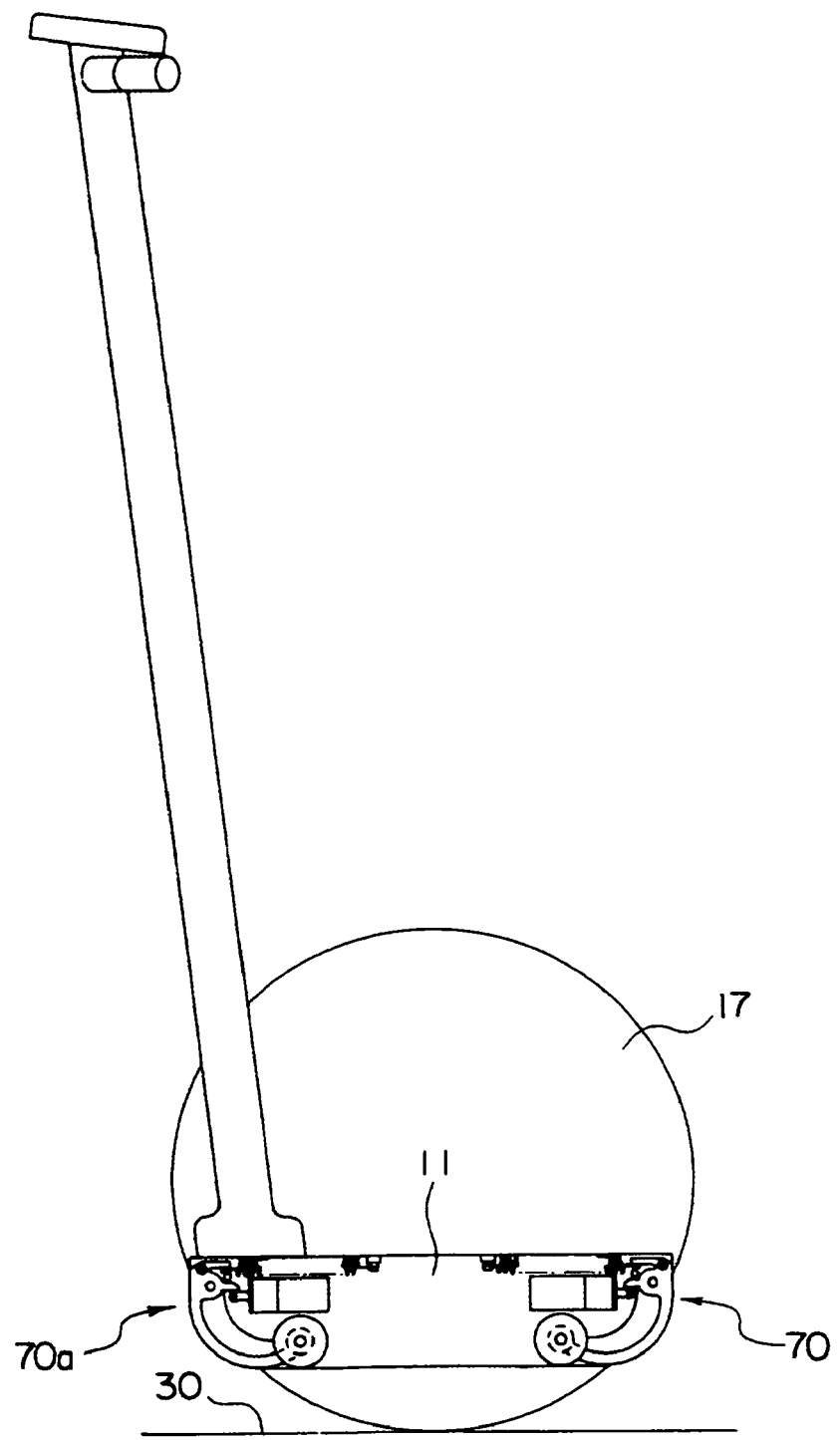
FIG. 9 is a view explaining a modification of the two-wheeled vehicle shown in FIG. 3.

The present invention, for example as shown in FIG. 9, may also be configured providing a second auxiliary wheel mechanism of the same configuration as the second auxiliary wheel mechanism 70 including the second auxiliary wheel 60 and its surrounding components shown in FIG. 7 and FIG. 8 at the two-wheeled vehicle 10 at the side in the direction of advance instead of the configuration of the first auxiliary wheel 41 in the configuration shown in FIG. 4 to FIG. 6.

Below, examples of operation of the two-wheeled vehicle 10 will be explained.

First Example of Operation

In this example of the operation, an explanation will be given of the case where the two-wheeled vehicle 10 suffers from an abnormality. If the controller 120 shown in FIG. 2 detects abnormal operation of the two-wheeled vehicle 10 based on a detection signal from a sensor of the sensor group 20 or depression of a not shown emergency stop switch, it outputs a control signal instructing the spring out of first auxiliary wheel 41 and second auxiliary wheel 60 to the drive circuit 112 and the drive circuit 113. When receiving the control signal from the controller 120, the drive circuit 112 and drive circuit 113 output drive signals to the auxiliary wheel actuator 114 and auxiliary wheel actuator 115. The auxiliary wheel actuator 114 moves the projection 47 to a position away from the recess 46 (moves it in the right direction in FIG. 4) to release the lock of the recess 46 and projection 47 as shown in FIG. 5 based on the drive signal from the drive circuit 112. Due to this, the biasing force of the coil spring 45 causes the shank 44 to move (move downward in FIG. 5) and the first auxiliary wheel 41 to contact the road surface. That is, the first auxiliary wheel 41 springs out.

Further, the auxiliary wheel actuator 115 moves the projection 68 in a direction disengaging it from the recess 67 (left direction in FIG. 7) as shown in FIG. 8 based on the drive signal from the drive circuit 113. Due to this, the projection 67 and projection 68 are disengaged and the biasing force of the coil spring 65 causes the arm 62 to turn in the direction of the arrow in FIG. 7 and the second auxiliary wheel 60 to spring out toward the road surface 30 as shown in FIG. 8. Further, the controller 120 outputs a control signal instructing stopping to the drive circuit 110 and the drive circuit 111. Due to this, the first motor 12 and the second motor 13 are stopped from driving the first wheel 16 and the second wheel 17.

As explained above, if the controller 120 detects an abnormality of the two-wheeled vehicle 10, the two-wheeled vehicle 10 will make the first auxiliary wheel 41 and the second auxiliary wheel 42 spring out toward the road surface 30 automatically. Therefore, it is possible to prevent the two-wheeled vehicle 10 from tipping over and stop the two-wheeled vehicle 10 safely. Further, according to the two-wheeled vehicle 10, at the time of normal operation, the first auxiliary wheel 41 and the second auxiliary wheel 60 are in a recessed state and do not contact the road surface 30, so the mobility of the two-wheeled vehicle 10 is not lost. Further, when the two-wheeled vehicle 10 returns from an abnormal operation state to the normal operation state, for example, it is possible to recess the first auxiliary wheel 41 and the second auxiliary wheel 60 manually.

Second Example of Operation

In this example of operation, the case where the two-wheeled vehicle 10 is normal in state will be explained. In the state where the first wheel 16 and the second wheel 17 do not turn, there is no stable point other than where the tilt angle θ becomes zero. However, this stable point is an unstable point of equilibrium, so if the tilt angle θ becomes off by a value other than zero, the step board 11 will turn about its axle until contacting the road surface.

Next, if the first wheel 16 and the second wheel 17 are driven to rotate by the first motor 12 and the second motor 13, both of the rotors and stators forming the motors relatively rotate with respect to each other. In a rotor type motor, the stator forms part of the outside covering the motor, the outer periphery are fixed to the step board 11, and rotation of the motor occurs as relative motion with respect to the outer periphery. Therefore, when a load is coupled with the shaft of a motor, a motor reaction force tilting the step board 11 in the + or − direction occurs in accordance with the magnitude of that load. The magnitude of the load at that time is a value obtained by conversion of the rolling frictional force when the first wheel 16 or the second wheel 17 roll on the road surface 30 at the shaft of the first motor 12 or the second motor 13. The step board 11 is comprised of a single sheet of highly rigid plate, so the motor reaction force applied to the step board 11 becomes the composite of the motor reaction forces of the first motor 12 and second motor 13.

On the other hand, if the operator riding the step board 11 changes the position of his or her center of gravity, a rotational force of a magnitude corresponding to a product of the distance of the line connecting the center of gravity position and axle (axis of center of gravity) to the step board 11 and the component of gravitational acceleration perpendicularly intersecting the axis of the center of gravity occurs at the step board 11 around the axle. When the motor reaction forces and this rotational force are equal in magnitude, the tilt angle θ of the step board 11 is maintained, so the step board 11 does not contact the road surface. Further, the first motor 12 and the second motor 13 continue to turn, so the two-wheeled vehicle 10 continues to move. If the first motor 12 and the second motor 13 turn in the direction in which the two-wheeled vehicle 10 advances at that time, the torque reactions act in a direction increasing the tilt θ of the step board 11. Further, the tilt angle θ of the step board 11 continues to increase in the positive direction and finally the step board 11 and the road surface 30 come into contact. Here, if the tilt angle θ of the step board 11 is detected by the sensor group 20 and adjustment is made to weaken the torque reactions of the first motor 12 and the second motor 13, the tilt angle θ of the step board 11 decreases.

Conversely, when the tilt angle θ of the step board 11 is negative, if there is no change in the torques of the first motor 12 and the second motor 13, the tilt angle θ of the step board 11 continues to increase in the negative direction and finally the step board 11 contacts the road surface 30. Here, if the torques of the first motor 12 and the second motor 13 are raised, even if the torque reactions also increase, the tilt angle θ of the step board 11 decreases. Raising the torques of the first motor 12 and the second motor 13 raises the speeds of the motors, so the speeds of the first wheel 16 and the second wheel 17 also rise and the running speed of the two-wheeled vehicle 10 becomes faster. In the present embodiment, the drive 23 controls the torques of the first motor 12 and the second motor 13 based on the tilt angle θ of the step board 11 so as to hold the two-wheeled vehicle 10 in a stable posture.

Second Embodiment

The second embodiment corresponds to the second aspect of the invention and the third aspect of the invention. In the above first embodiment, the case was illustrated of making the first auxiliary wheel 41 and the second auxiliary wheel 60 spring out toward the road surface 30 to hold the posture of the two-wheeled vehicle 10 stable when shifting from normal operation to abnormal operation. In the present embodiment, the explanation will be given of the case of making a braking means having a braking surface spring out toward the road surface to contact the road surface 30 in a stable posture when shifting from normal operation to abnormal operation. Note that the two-wheeled vehicle of the present embodiment for example has all of the configuration of the first embodiment. Note that in the present invention, in the configuration of the first embodiment, the parts relating to the first auxiliary wheel 41 and the second auxiliary wheel 42 may also be omitted.

Figure 10:
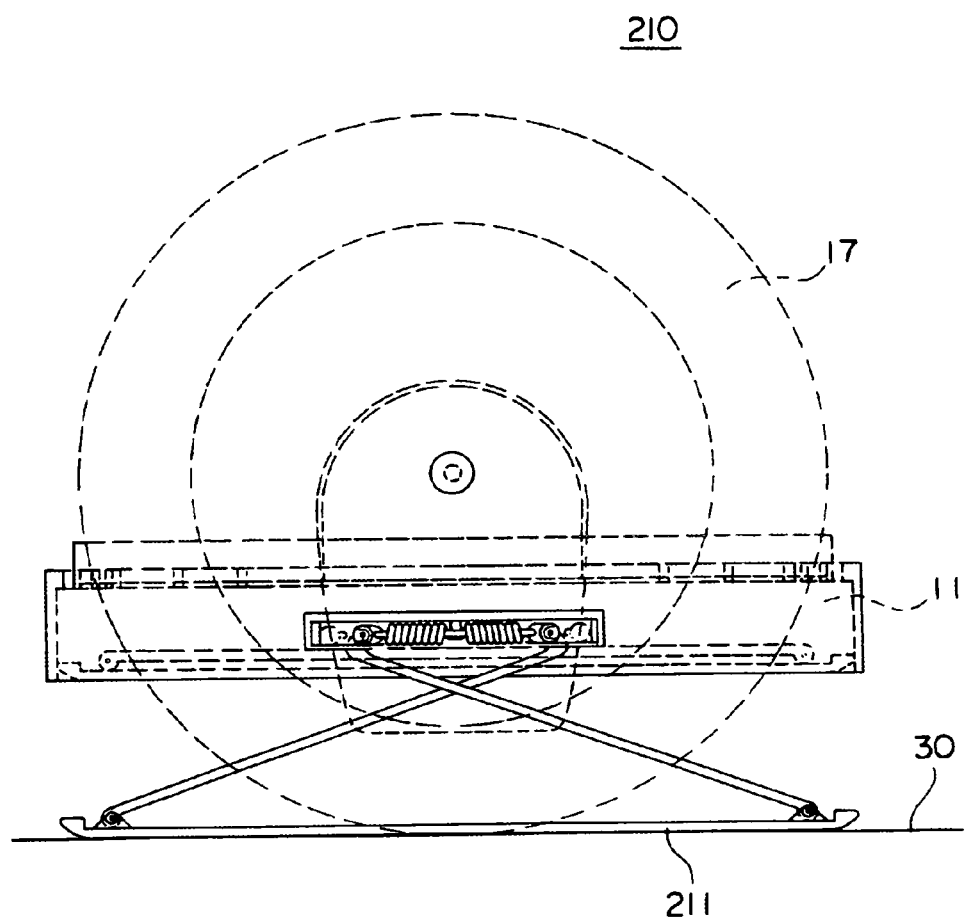
FIG. 10 is a view explaining a braking mechanism provided at the two-wheeled vehicle of the second embodiment of the present invention.

FIG. 10 is a view for explaining the braking mechanism provided at the two-wheeled vehicle 10 of the present embodiment. As shown in FIG. 10, the two-wheeled vehicle 210 has a brake 211 of a sled shape as the braking means 211. FIG. 10 shows the state where the brake 211 springs out and contacts the road surface 30.

Figure 11A:
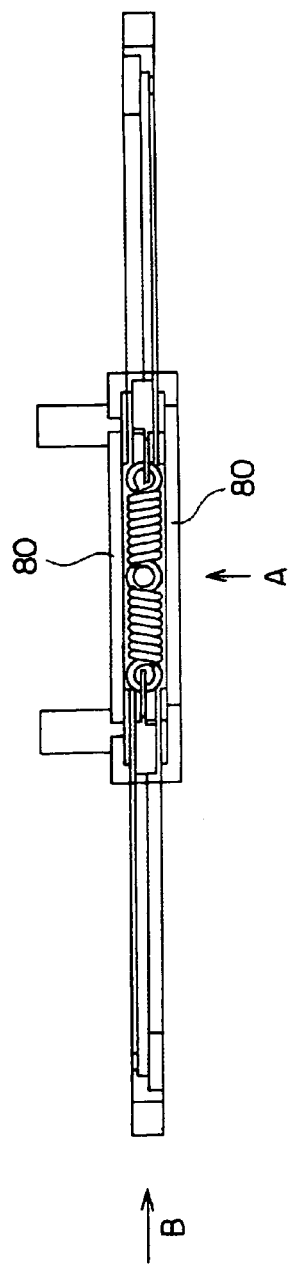
Figure 11B:
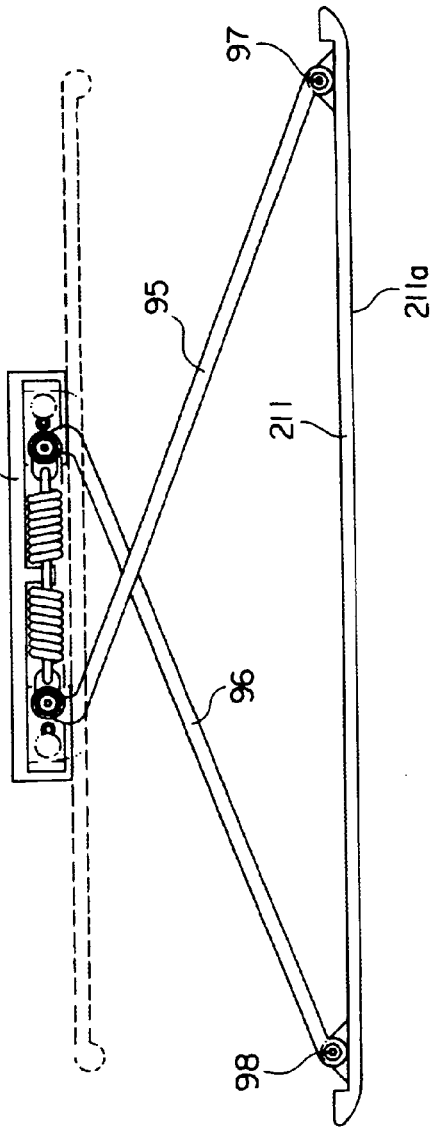
Figure 11C:
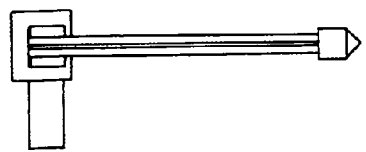

FIGS. 11A to 11C are views for explaining the configuration of the brake 211. FIG. 11A is a front view (seen from above step board 11), FIG. 11B is a side view seen from the side of the arrow A shown in FIG. 11A, and FIG. 11C is a side view seen from the side of the arrow B shown in FIG. 11A.

For example, the drive mechanism shown in FIGS. 12A-12B and the brake 211 correspond to the braking means of the present invention, while the brake 120 shown in FIG. 2 corresponds to the control means of present invention.

As shown in FIGS. 12A-12B, a braking base 80 fixed to the step board 11 houses coil springs 81 and 82, a first moving body 83, and a second moving body 84. Note that the braking mechanism of the present embodiment is for example provided between the first wheel 16 and second wheel 17 of the step board 11. Single ends of the coil springs 81 and 82 are fixed to a fixing part 85 fixed to the brake base 80 or the step board 11. The other end of the coil spring 81 is fixed to the first moving body 83, while the other end of the coil spring 82 is fixed to the second moving body 84. The first moving body 83 has one end of a rod 95 attached to it rotatably, while the second moving body 84 has one end of a rod 96 attached to it rotatably. Further, the other end of the rod 95 is coupled with one end of the brake 211 through the shaft 97 of the brake 211. The other end of the rod 96 is coupled with the other end of the brake 21 through the shaft 98 of the brake 211.

The braking base 80 or the step board 11 has solenoid valves 90 and 91 fixed to it. The solenoid valve 90 for example inserts a projection 92 into a path of movement of the first moving body 83 or retracts it from it based on a control signal from the controller 120 shown in FIG. 2. Specifically, the solenoid valve 90 positions the projection 92 in the path of movement of the first moving body 83 to lock the first moving body 83, biased toward the fixing part 85 by the biasing force of the coil spring 81 at the time of normal operation, from movement toward the fixing part 85 (dotted line in FIGS. 12A-12B). Further, the solenoid valve 90 positions the projection 92 outside of the path of movement of the first moving body 83 at the time of abnormal operation. Due to this, due to the action by the movement of the second moving body 84 explained later and the biasing force of the linked coil spring 81, the first moving body 83 moves toward the fixing part 85 (solid line in FIGS. 12A-12B) and brings the braking surface 211a of the brake 211 into contact with the road surface 30 as shown in FIGS. 11B and 11C.

The solenoid valve 91 makes the projection 93 leave and enter the path of movement of the second moving body 84 based on a control signal from the controller 120 shown in FIG. 2. Specifically, the solenoid valve 91 positions the projection 93 in the path of movement of the second moving body 84 to lock the second moving body 84 (dotted line in FIGS. 12A-12B), biased by the biasing force of the coil spring 82 toward the fixing part at the time of normal operation, from movement toward the fixing part 85. Further, the solenoid valve 91 positions the projection 93 outside of the path of movement of the second moving body 84 at the time of abnormal operation. Due to this, due to the action by the movement of the first moving body 83 explained above and the biasing force of the linked coil spring 82, the second moving body 84 moves toward the fixing part 85 (solid line in FIGS. 12A-12B) and brings the braking surface 211a of the brake 211 into contact with the road surface 30 as shown in FIGS. 11B and 11C.

Note that the above braking mechanism is stored compactly at the bottom of the step board 11. In a normal state, it also functions as a stand by driving the solenoid valves 90 and 91 to release the lock by the projections 92 and 93 by a not shown manual switch. The above braking mechanism is restored to the recessed state by releasing the lock by the projections 92 and 93 manually, raising the brake 211 toward the step board 11, and locking it by the projections 92 and 93. By using rods 95 and 96 of a high rigidity spring steel-based material, it is possible to absorb any shock received and avoid breakage.

Next, an example of the operation when an abnormality occurs in the two-wheeled vehicle 210 will be explained. When the brake 120 shown in FIG. 2 detects abnormal operation of the two-wheeled vehicle 10 based on a detection signal from a sensor of the sensor group 20, depression of a not shown emergency stop switch, etc., it outputs to the solenoid valves 90 and 91 a control signal (drive signal) instructing the brake 211 to spring out. The solenoid valves 90 and 91 position the projections 92 and 93 outside of the paths of movement of the first moving body 83 and the second moving body 84 based on the control signal from the controller 120. Due to the biasing force of the linked coil springs 81 and 82, the first moving body 83 and the second moving body 84 move toward the fixing part 85 and, as shown in FIGS. 11B and 1C, the braking surface 211a of the brake 211 contacts the road surface 30. Therefore, the two-wheeled vehicle 210 decelerates and stops due to the frictional force between the braking surface 211a and the road surface 30.

As explained above, the two-wheeled vehicle 210 can instantaneously stop the two-wheeled vehicle 210 by bringing the brake 211 into contact with the road surface 30 at the time of abnormal operation.

The present invention is not limited to the above embodiments. For example, there may be any number of auxiliary wheels at any positions in the first embodiment. Further, a brake 211 and its movement mechanism may be provided at a vehicle other than a two-wheeled vehicle in the second embodiment. Further, the braking surface 211a of the brake 211 may be of any shape.

Summarizing the effects of the invention, as explained above, according to the present invention, it is possible to provide a two-wheeled vehicle able to assist wheels to keep the chassis in a stable posture at the time of abnormal operation without detracting from mobility at the time of normal operation. Further, according to the present invention, it is possible to provide a chassis braking system able to effectively brake a running chassis and a two-wheeled vehicle using that chassis braking system.

While the invention has been described with reference to specific embodiments chosen for purpose of illustration, it should be apparent that numerous modifications could be made thereto by those skilled in the art without departing from the basic concept and scope of the invention.

What is claimed is:

1. A chassis braking system for braking a chassis, comprising:
    a braking device comprising a lock and a braking surface biased toward a road surface on which said chassis runs and having a first state, where movement of said braking surface toward said road surface is locked by said lock, and a second state where said braking surface abuts against said road surface and
    a controller that releases said lock of said braking device and shifts said braking device from said first state to said second state when a predetermined condition is met.

2. A chassis braking system for braking a chassis, comprising:
    a braking device comprising a braking surface biased toward a road surface on which said chassis runs and having a first state, where movement of said braking surface toward said road surface is locked and a second state where said braking surface abuts against said road surface and
    a controller that releases said lock of said braking device and shifting said braking device from said first state to said second state when predetermined conditions are met wherein
    said braking device includes
    a first moving body and a second moving body biased in directions approaching each other and
    a movement mechanism that causes said braking surface to move toward said road surface as said first moving body and said second moving body approach each other,
    wherein, in said first state, movement of said first moving body and said second moving body to approach each other is locked.

3. A two-wheeled vehicle comprising
    a first wheel and a second wheel that rotate about shafts perpendicular to a running direction and arranged on a chassis along said perpendicular direction,
    a braking means comprising device including a lock and a braking surface biased toward a road surface on which said first wheel and said second wheel run and including a first state where movement of said braking surface toward said road surface is locked and a second state where said braking surface abuts against said road surface, and
    a controller that releases said lock of said braking device and shifts said braking device from said first state to said second state when a predetermined condition is met.

4. The chassis system of claim 1, wherein the controller receives an input signal from at least one sensor and generates a drive signal to release the lock such that the braking surface moves to the second state where said braking surface abuts against said road surface.

5. The chassis system of claim 4, wherein the input signal includes information relating to at least one a pitch angle of the chassis, a roll angle of the chassis, and a yaw angle of the chassis.

6. The chassis system of claim 4, wherein the input signal includes information relating to at least one a torque load on a motor disposed in the chassis, a temperature in a radiator disposed in the chassis, and a voltage provided by a battery disposed in the chassis.

7. The chassis system of claim 1, wherein the chassis includes a motor, a battery, and a solenoid.

8. The chassis system of claim 1, wherein the lock includes at least one solenoid.

9. The chassis system of claim 8, wherein the at least one solenoid moves a projection in a pathway of a first moving body that moves in a direction parallel to the ground.

10. The chassis system of claim 8, wherein the at least one solenoid includes first and second solenoids that move first and second projections, respectively, in a pathway of first and second movable members.

11. The chassis system of claim 10, wherein the first and second movable members are biased to move in opposite directions.

* * * * *